Jan. 27, 1942.  I. F. WALKER  2,271,156

MULTIPLE COMPARTMENT FOOD CONTAINER

Filed Nov. 23, 1938  4 Sheets-Sheet 1

ISABEL F. WALKER
INVENTOR.

BY Albert F. Robinson

ATTORNEY.

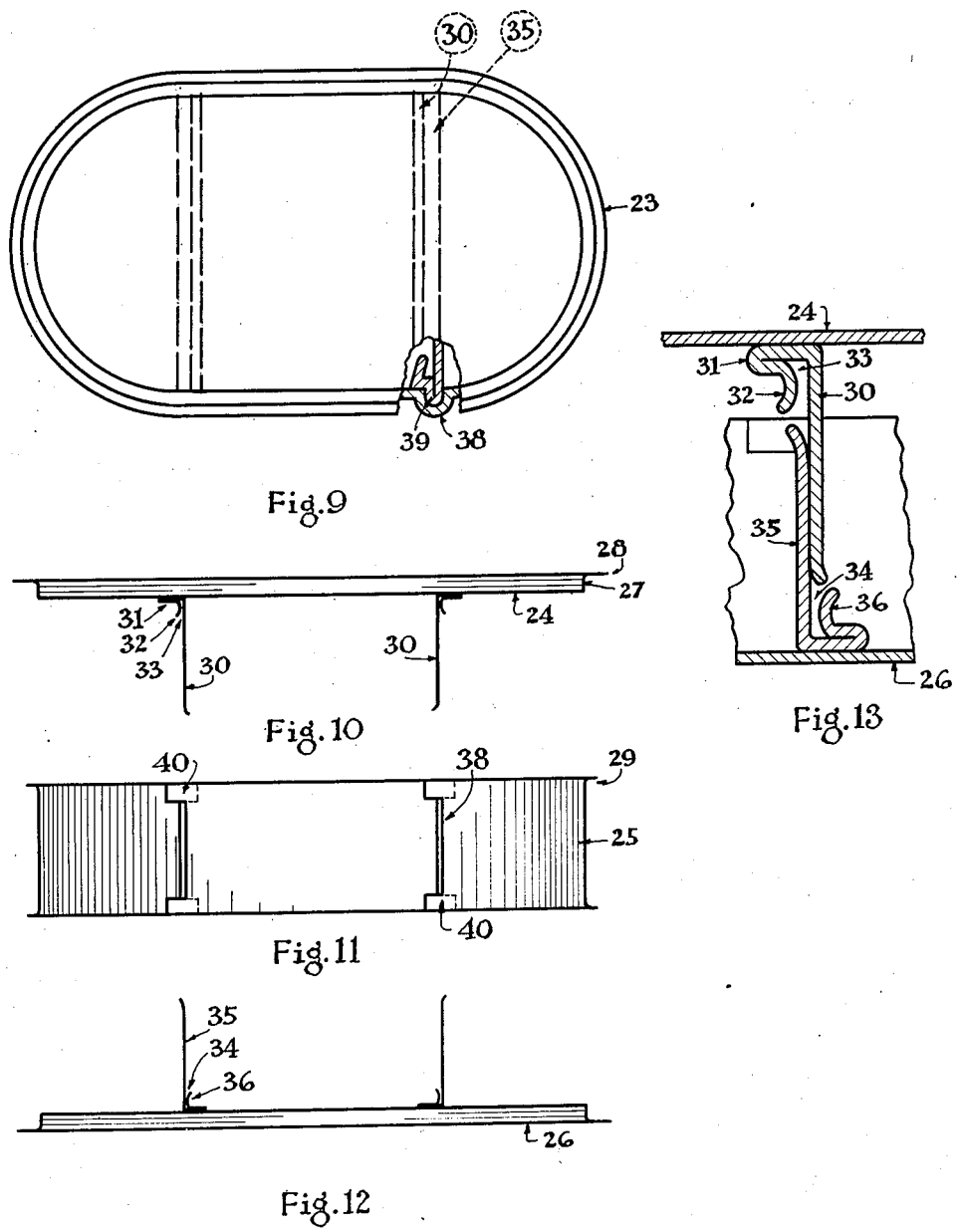

Jan. 27, 1942.   I. F. WALKER   2,271,156
MULTIPLE COMPARTMENT FOOD CONTAINER
Filed Nov. 23, 1938    4 Sheets-Sheet 3
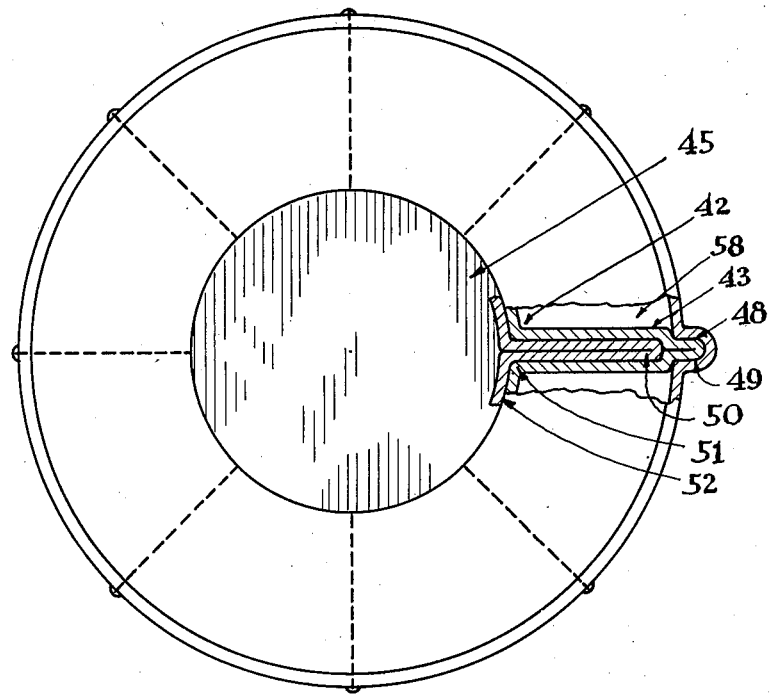
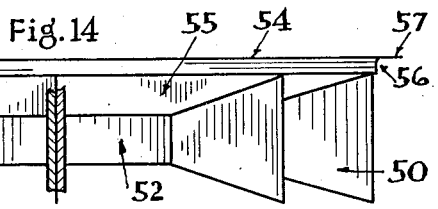
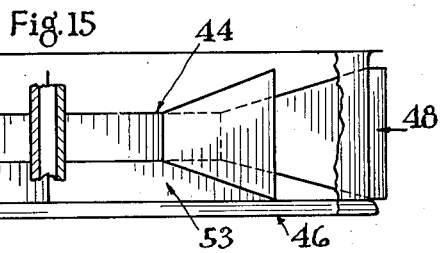
ISABEL F. WALKER
INVENTOR.
BY Albert F. Robinson
ATTORNEY.

ISABEL F. WALKER
*INVENTOR.*
BY *Albert F. Robinson*
ATTORNEY.

Patented Jan. 27, 1942

2,271,156

UNITED STATES PATENT OFFICE 2,271,156

MULTIPLE COMPARTMENT FOOD CONTAINER

Isabel F. Walker, Chicago, Ill.

Application November 23, 1938, Serial No. 241,978

2 Claims. (Cl. 220—8)

This invention relates to a plurality of different food products packed in a unitary package or container suitable for serving in combinations with the individual products separated and sealed from each other in separate compartments to prevent mixing of the different products and commingling of their odors or aromas. A multiple compartment container is provided with separate compartments which are each filled with a different food product and then all compartments are simultaneously closed and sealed with the different food products isolated and segregated from each other.

The invention pertains to a package or container of a unitary construction provided with multiple compartments that can be simultaneously sealed and also to the method of simultaneously sealing a multiple of compartments whereby the flavors of the different food products, as well as intermixture of the different products, may be prevented.

Generally described, a base member is constructed with a bottom having angularly disposed spaced apart walls or partitions to provide two or more compartments between the spaced apart walls or partitions. A cover member is provided with means whereby same may be readily assembled with the base member and close each of the compartments therein. The package or container can be made of a minimum number of parts by having projection means on the cover telescoping with the walls of the base member, and means on the projection means and walls for interfitting together. The package is particularly suitable for combinations of the different food products that are desired to be served for a meal, and particularly those that are to be mixed when served. For example, to properly prepare and serve chilli-con-carne certain meats are cooked and seasoned with various sauces and condiments, and to these are added a variety of red beans that have been separately cooked. If the beans, sauces and meats be mixed together for an extended time before being consumed, the heat producing particles of the meat penetrate and are absorbed by the beans, thereby impairing the gastronomic value of the chilli-con-carne and making it less digestible. Instead of cooking and mixing the ingredients of chilli-con-carne or other food combinations and packing the mixed ingredients as is now the practice, my invention proposes to cook and pack the ingredients for future consumption, but not to mix them until they are to be prepared for consumption.

Upon sealing the multiple container in accordance with my invention, when one compartment is closed under a condition to produce a certain vacuum or pressure per square inch, the other or other compartments are likewise closed under the same conditions and have the vacuum or pressure per square inch being equal in all compartments.

With the conditions in the different compartments the same, the flavors and aromas of the food product in one compartment is confined therein and prevented from permeating into another compartment to commingle with the flavor and aroma of the food product in another compartment. The inner compartment or compartments are simultaneously closed with the outer compartment when the cover member is applied.

For a better understanding of the invention reference may be made to the drawings in which:

Figure 9 is a top plan view, with parts broken away, of another embodiment of the invention;

Figures 10, 11 and 12 are side elevations respectively of a cover member, an intermediate wall member, and a bottom member assembled to form that embodiment shown in Figure 9;

Figure 13 is an enlarged detailed view of a section of a division wall section in the embodiment of Figure 9 to illustrate the manner of assembly;

Figure 14 is a top plan view of still another embodiment;

Figures 15 and 16 are side elevations of respective top and bottom members which are assembled to form the embodiment in Figure 14;

Figure 1:
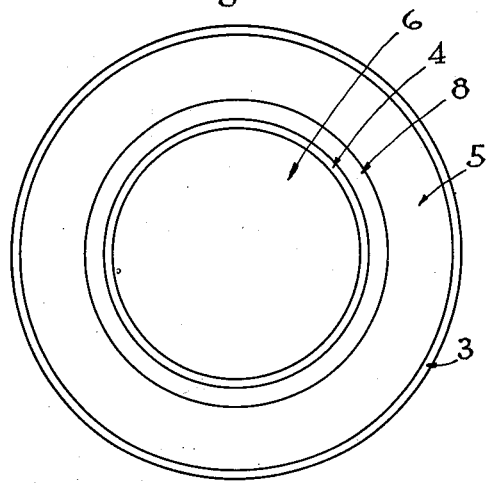
Figure 1 is a top plane view, looking down in the direction of the arrows on line A—A of Figure 3 of a base member employed in one embodiment of the invention.
Figure 5:
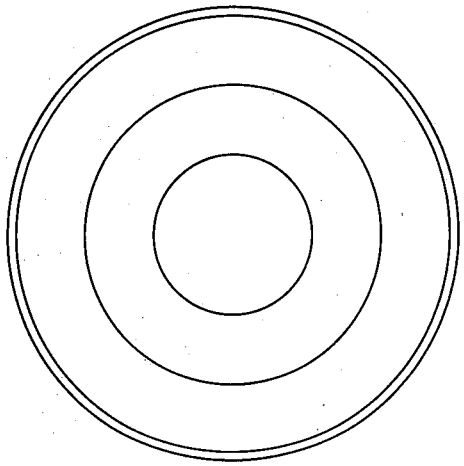
Figure 5 is a top plan view, taken on lines B—B of Figure 7, of a base member employed in another embodiment of the invention.
Figure 2:
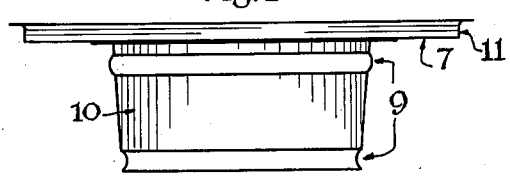
Figure 2 is a side elevation of a cover member for the base member shown in Figure 1.
Figure 6:
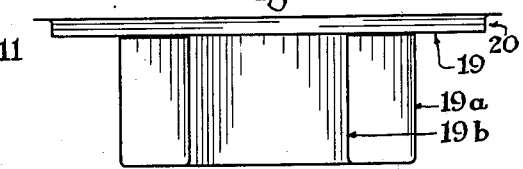
Figure 6 is a side elevation of a cover member for the base member shown in Figure 5.
Figure 3:
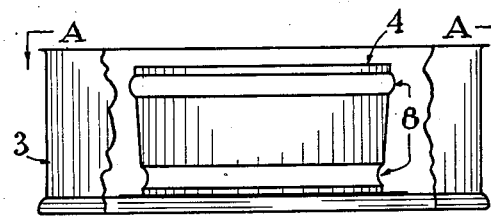
Figure 3 is a side elevation, with parts broken away, of the base member.
Figure 7:
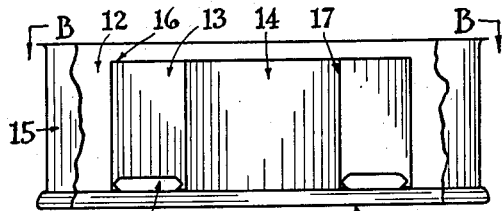
Figure 7 is a side elevation, with parts broken away, of the base member in Figure 5.
Figure 4:
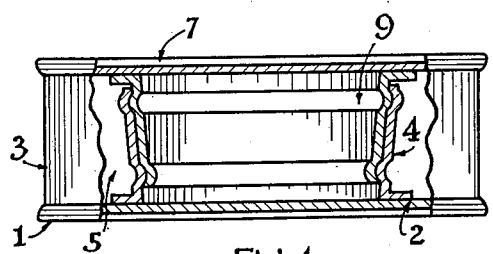
Figure 4 is a side elevation of a packing container unit, with parts broken away, composed of the cover and base members assembled together.
Figure 8:
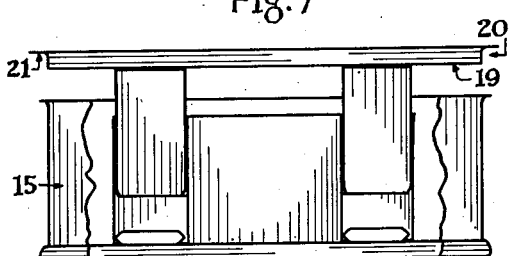
Figure 8 is a side elevation of that embodiment of a packing container unit, with parts broken away, composed of the cover and base member shown respectively in Figures 6 and 7.

Referring specifically to the drawings, in which like numerals are used to designate like parts, numeral 1 designates a base member having an end 2 provided with angularly disposed members 3 and 4 integrally formed therewith or attached thereto. Although the base member may be of any shape, it is preferably circular. The angularly disposed member 3 is arranged at or near the edge of the end 2 of the base member, and the other angularly disposed member 4 is preferably arranged concentric therewith, thereby providing one compartment 5 between the two members 3 and 4 and an inner compartment 6 within the confines of the member 4. The members 3 and 4 can be integrally formed with the base member 1 or attached thereto in any conventional manner, as by welding, soldering, or the like.

The base member as above described is constructed to receive a cover member 7 for closing the compartments 5 and 6 and hold the cover assembled therewith. To this end the member 4 is provided with one or more beads 8, preferably annular, to cooperate with complementary beads 9 arranged on a member 10, similar to member 3, that is fixed to the cover member. The members 3 and 10 telescope together, and are snapped together by the beads on one member fitting the beads of the other member. The cover member is stepped at 11 to seat within the stepped edge of the outer wall. All the parts of the cover and base members are preferably made of metal. Additional compartments can be formed by providing additional angularly disposed members like 4 and spaced apart therefrom.

The embodiment in Figures 5 to 8, inclusive, is much the same as that shown in Figures 1 to 4, inclusive. It shows three annular compartments 12, 13 and 14, formed by annular members 15, 16 and 17 attached to and angularly disposed to the base member 18 to cooperate with the cover member 19, having projecting members 19a and 19b telescoping with members 16 and 17. A stepped edge 20 of the cover fits snugly with the edge of the member 15 with the lip 21 projecting over the edge. The ends of members 16 and 17 on the cover are bent slightly inward to provide a constricted neck to snap over and engage with a button or embossment 22 attached to the base member 18.

The embodiment in Figures 9 and 13, inclusive, comprises a unit 23 built by the assembly of the parts 24, 25 and 26. Part 24 has a stepped head 27 with an overhanging lip 28 projecting to mate with the lip 29 on the member 25. Two transverse spaced apart division walls 30 are fixed to the part 24, said partition walls having a base 31 from which a flared lip 32 is formed to provide a spring socket 33 between the lip 32 and the partition wall 30. The edges of partition walls 30 are bent inwardly to fit in sockets 34, formed between the partition wall 35 and lip 36 on the part 26, and snap over the lip 36. The outer ends of partition walls 35 are flared outwardly to fit in the sockets 33 and snap with the lip 32. Either or both of the snap connections may be provided. The parts 24, 25 and 26 are preferably elliptical although they may be of any shape. The inner wall of the intermediate member 25 has vertical recesses 38 to receive the ears 39 on the partition members. The margins of the intermediate member 25 are cut away at 40 to accommodate the ends of the base and lip of the partition members. Three compartments are formed in the packing unit.

The modification in Figures 14 to 16, inclusive, discloses a packing unit having a multiple forming compartment insert 42 with radial arms 43 annularly disposed about the wall 44 of a central compartment 45. A base member 46 has an upstanding wall 47 provided at spaced intervals on its inner side with vertical grooves 48, each of which receives the end 49 of a radial arm. The radial arms are recessed to receive the radial arm 50 of a complementary insert 51. The radial arms 50 extend from a wall 52 that fits inside of the wall 44 of the insert 42. The side edges of the radial arms of the inserts are inclined downwardly from the outer ends to the ends that are attached to the circular wall portions. The inner wall 53 of the base member is inclined to conform to the contour of the side edges of the radial arms of the inserts. Closure means 54 also has an inner wall 55 conforming to the contour of the side edges of the radial arms. A stepped edge 56 with the overhanging lip 57 on the closure fits over the open end of the base member. Compartments 58 are radially disposed between the radial arms surrounding the central compartment 45. This construction prevents any tendency for the base and cover members to buckle when they are assembled, thereby keeping the compartments tightly sealed when the parts are in place.

Figure 17:
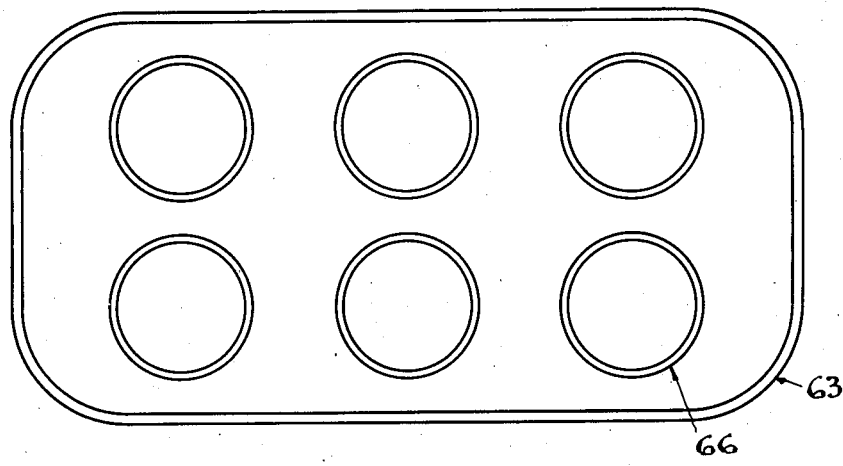
Figure 17 is a top plan view of still another embodiment.
Figure 18:
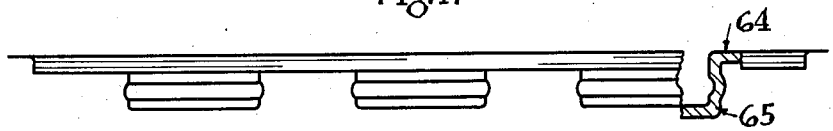
Figure 18 is a side elevation of the cover member in the embodiment of Figure 17.
Figure 19:
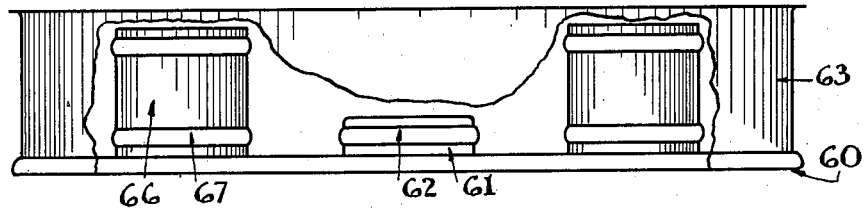
Figure 19 is a side elevation, with parts broken away, of the bottom member and intervening wall member.
Figure 20:
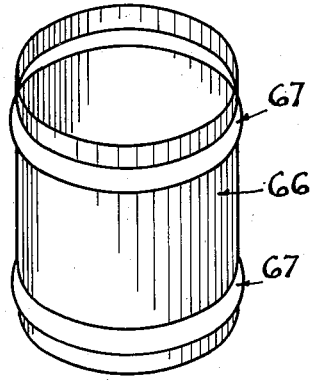
Figure 20 is a perspective view of one of the plurality of wall members to be associated between the cover and bottom members to provide individual compartments.

In the embodiment in Figures 17 and 20, inclusive, a base member 60 is provided with any number of stamped embossments or projections 61, preferably of circular conformation. An annular bead 62 is formed on each of the embossments. The base member has an upstanding wall 63 to receive a closure place 64 which is provided with embossments 65 disposed opposite to and identical to those formed on the base member. Tubular members 66, provided with a bead 67 on opposite ends, fit between the base and closure members with the ends of the tubular members fitting over the embossments on the base and closure members. The beads on the respective members interfit to securely hold the parts together. As in the other embodiments, there is a stepped edge and overhanging lip on the closure member to fit snugly with the edge of the base member.

The parts of the various embodiments to be assembled are tight fitting and ordinarily are sufficiently fitted to effectively seal the chambers. Rubber gaskets or the like may, however, be employed, if desired, these being easily seated between the mating lips of the closure and base members. Or in lieu of gaskets, the parts may be welded, soldered or otherwise sealed at the seams or joints of the mating parts.

The above described constructions illustrate some of the embodiments of the invention, but it will be understood that there may be various changes in details of construction without departing from the spirit of the invention.

I claim:

1. A compartment can for packaging foods of different kinds comprising a base member, a cover member, spaced apart telescoping double walls or partitions interposed between said base and cover members to provide a plurality of separate food compartments, one of the telescoping parts of the wall being attached to the cover member and the other telescoping part of the wall being attached to the base member, and beading means on the telescoping parts having a snap fit whereby same may be positively secured and readily assembled and disassembled.

2. A multiple compartment can for packing foods of different kinds comprising a base member, a cover member, spaced apart telescoping double walls or partitions interposed between said base and cover members to provide a plurality of separate food compartments, one of the telescoping parts of the wall being attached to the cover member and the other telescoping part of the wall being attached to the base member, and cooperating securing means on the telescoping parts.

ISABEL F. WALKER.